(12) United States Patent
Yoon

(10) Patent No.: US 9,685,791 B2
(45) Date of Patent: Jun. 20, 2017

(54) APPARATUS AND METHOD FOR CONTROLLING WIRELESS POWER TRANSFER TO MOBILE DEVICES

(75) Inventor: In-Soo Yoon, Seoul (KR)

(73) Assignee: SANDISK TECHNOLOGIES LLC, Plano, TX (US)

( * ) Notice: Subject to any disclaimer, the term of this patent is extended or adjusted under 35 U.S.C. 154(b) by 903 days.

(21) Appl. No.: 13/544,848

(22) Filed: Jul. 9, 2012

(65) Prior Publication Data
US 2014/0008990 A1 Jan. 9, 2014

(51) Int. Cl.
*H01F 38/00* (2006.01)
*H02J 5/00* (2016.01)
*H02J 7/00* (2006.01)
*H02J 7/02* (2016.01)

(52) U.S. Cl.
CPC ............ *H02J 5/005* (2013.01); *H02J 7/0044* (2013.01); *H02J 7/025* (2013.01)

(58) Field of Classification Search
USPC ......................................... 307/104
See application file for complete search history.

(56) References Cited

U.S. PATENT DOCUMENTS

| | | | |
|---|---|---|---|
| 2009/0322285 A1 | 12/2009 | Hautanen | |
| 2010/0181961 A1 | 7/2010 | Novak et al. | |
| 2010/0213895 A1 | 8/2010 | Keating et al. | |
| 2010/0290506 A1* | 11/2010 | Kerr et al. | 375/147 |
| 2011/0002360 A1* | 1/2011 | Michaels | H04L 9/001 375/132 |
| 2011/0115433 A1 | 5/2011 | Lee et al. | |
| 2011/0164471 A1 | 7/2011 | Baarman et al. | |
| 2012/0025622 A1* | 2/2012 | Kim et al. | 307/104 |
| 2012/0306284 A1* | 12/2012 | Lee | H02J 17/00 307/104 |
| 2012/0306287 A1* | 12/2012 | Kim et al. | 307/104 |
| 2013/0057078 A1* | 3/2013 | Lee et al. | 307/104 |
| 2013/0147279 A1* | 6/2013 | Muratov | 307/104 |

OTHER PUBLICATIONS

"System Description Wireless Power Transfer, Part 1: Interface Definition," vol. 1: Low Power, Version 1.0.3, Wireless Power Consortium, Sep. 2011, 153 pages.

* cited by examiner

*Primary Examiner* — Rexford Barnie
*Assistant Examiner* — Dru Parries
(74) *Attorney, Agent, or Firm* — Toler Law Group, PC

(57) ABSTRACT

A system for controlling wireless power transfer to mobile devices is disclosed. The system includes a power transmitter configured to transmit power via a wireless coupling to the mobile devices. Each of the mobile devices includes a power receiver configured to receive the power from the power transmitter via the wireless coupling with the power transmitter. Each power receiver is configured to transmit control data modulated with a spreading code via the wireless coupling to the power transmitter.

41 Claims, 14 Drawing Sheets

APPARATUS AND METHOD FOR CONTROLLING WIRELESS POWER TRANSFER TO MOBILE DEVICES

TECHNICAL FIELD

The present disclosure relates generally to wireless charging. More specifically, the present disclosure relates to an apparatus and method for controlling wireless power transfer between a power transmitter and a power receiver.

BACKGROUND

In recent years, the use of mobile devices has increased in popularity among consumers. For example, mobile devices such as personal digital assistants (PDAs), smartphones, cellular phones, tablet computers, laptop computers, digital cameras, and portable music or video players are being widely used by consumers due to their portability. To ensure their portability, these devices typically include a battery to allow a user to operate the devices without a continuous connection to a power adaptor.

In general, mobile devices are equipped with a rechargeable battery for supplying electrical power. Rechargeable batteries are typically charged via a physical electrical line to a power source. As an alternative to charging via a physical electrical connection, some mobile devices have allowed the batteries to be charged wirelessly.

In conventional wireless charging methods, a mobile device communicates power control information to a base station to control the power transfer from the base station. For example, in a wireless charging system using an out-of-band signaling approach, power control information is communicated in a channel that is different from the channel used for power transfer. However, this method requires the use of additional resources for the communication channel, with additional cost and complexity.

An in-band signaling approach allows the power control information to be communicated via the same channel used for power transfer. In this method, however, the information transmission from a mobile device may adversely affect the power transmission since both the information and the power are transmitted on the same channel. Further, conventional wireless charging methods typically allow charging between a single device and a base station. As such, the charging of multiple devices may require multiple base stations.

Thus, there is a need for a wireless charging system and method that can reliably and efficiently control the power transmitted to mobile devices without requiring multiple base stations.

SUMMARY

The present disclosure provides system, apparatus, and methods for controlling wireless power transfer to mobile devices.

According to one aspect of the present disclosure, a power receiver is disclosed. The power receiver includes a power pick-up unit configured to receive power from a power transmitter via a wireless coupling with the power transmitter. The power receiver also includes a control unit configured to adjust the power received from the power transmitter by transmitting control data to the power transmitter via the wireless coupling. In the power receiver, the control data is modulated with a spreading code.

According to another aspect of the present disclosure, a power transmitter for supplying power to a plurality of power receivers is disclosed. The power transmitter includes a power conversion unit configured to transmit power to the plurality of power receivers via a wireless coupling with the power receivers. Further, a control unit is provided in the power transmitter to receive, from at least one of the power receivers, control data modulated with a spreading code via the wireless coupling. The control unit is further configured to demodulate the control data with the spreading code to control the power transmitted to the at least one of the power receivers.

According to yet another aspect of the present disclosure, a system for controlling wireless power transference is disclosed. The system includes a power transmitter configured to transmit power via a wireless coupling. The system further includes a plurality of power receivers configured to receive the power from the power transmitter via the wireless coupling with the power transmitter. Each of the power receivers is configured to transmit control data modulated with a spreading code via the wireless coupling to the power transmitter. In this system, each of the control data is adapted to control the power transmitted from the power transmitter. Based on at least one of the control data, the power transmitter adjusts the power and transmits the adjusted power via the wireless coupling.

According to yet another aspect of the present disclosure, a method for controlling power transmission to a mobile device is disclosed. The method includes receiving, by a power receiver in the mobile device, power from a power transmitter via a wireless coupling between the power transmitter and the power receiver. Control data modulated with a spreading code is transmitted by the power receiver via the wireless coupling to adjust the power from the power transmitter. An adjusted power is transmitted by the power transmitter to the power receiver based on the control data via the wireless coupling. This disclosure also describes an apparatus, a combination of means, and a computer-readable medium relating to this method.

DETAILED DESCRIPTION

Figure 1:
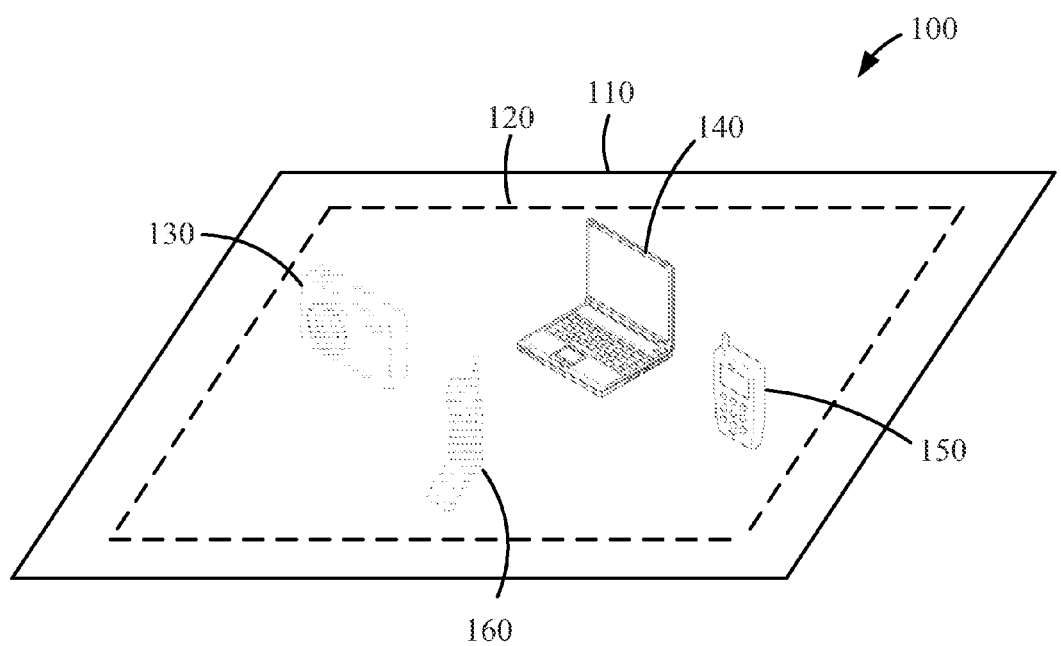
FIG. 1 illustrates a schematic overview of a wireless charging system for charging a plurality of mobile devices with power supplied from a pad-type base station according to one embodiment.

Various embodiments will now be described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates an overview diagram of a wireless charging system 100 for charging a plurality of mobile devices 130, 140, 150, and 160 with power supplied from a pad-type base station 110 according to one embodiment. In this system 100, the base station 110 is configured to wirelessly transmit power through a wireless coupling such as an induction or magnetic resonance coupling between the base station 110 and the mobile devices 130, 140, 150, and 160. The mobile devices include a camera 130, a portable computer 140, a smart phone 150, and a cellular phone 160 which are located at least partially in a charging region 120 of the base station 110 and configured to wirelessly receive power from the pad-type base station 110.

The charging region 120 indicates an area of the pad-type base station 110 in which a wireless power coupling may be established for wireless power transfer. In some embodiments, the charging region 120 may be configured to have any suitable size to accommodate various types or sizes of mobile devices.

Figure 2:
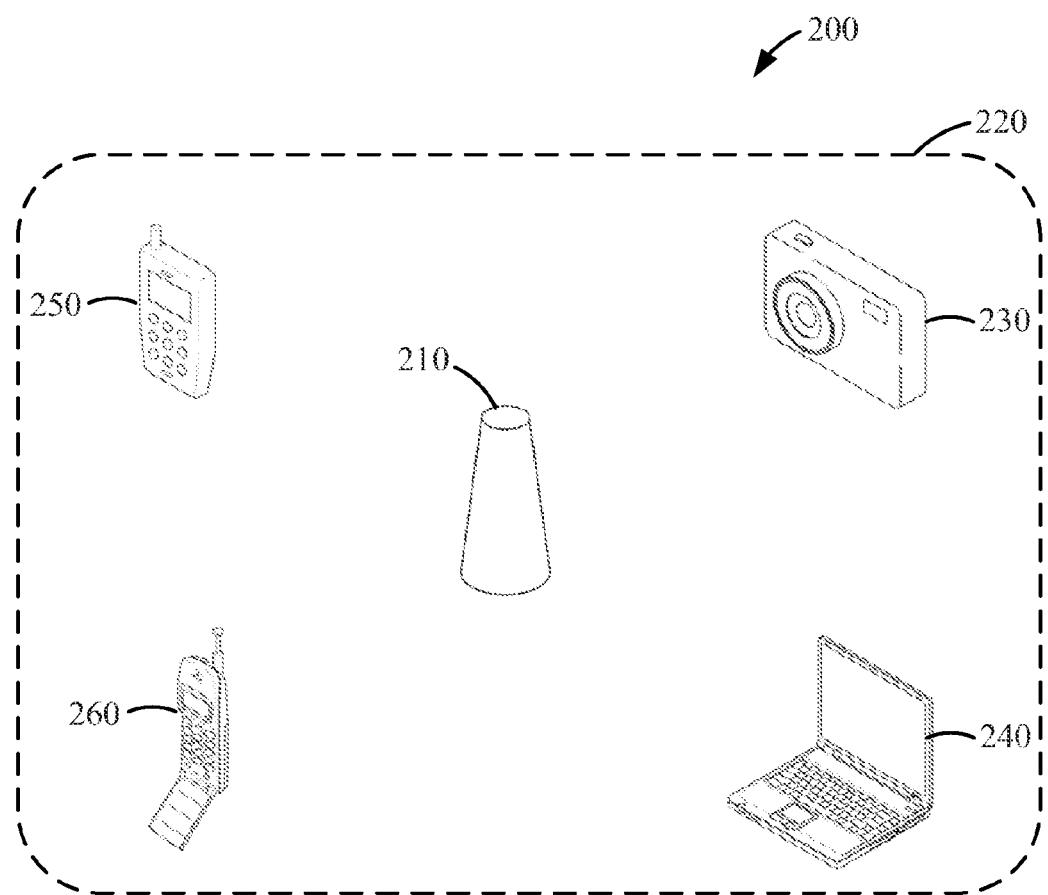
FIG. 2 illustrates a schematic overview of a wireless charging system for charging a plurality of mobile devices with power supplied from a pod-type base station according to one embodiment.

FIG. 2 illustrates an overview diagram of a wireless charging system 200 for charging a plurality of mobile devices 230, 240, 250, and 260 with power supplied from a pod-type base station 210 according to one embodiment. The base station 210 is configured to wirelessly transmit power via a wireless coupling formed using a radiating element, such as an antenna, to the mobile devices 230, 240, 250, and 260, which are illustrated as a camera, a portable computer, a smart phone, and a cellular phone, respectively. The mobile devices 230, 240, 250, and 260 are located in a vicinity of the base station 210 to receive power wirelessly from the pod-type base station 210.

In the wireless charging system 200, the pod-type base station 210 may provide power to the mobile devices 230, 240, 250, and 260, which are located at least partially in a charging region 220. The charging region 220 indicates an area, which may be over a range of several meters, within which a wireless power transfer may be performed. Thus, in one embodiment, if the pod-type base station 210 is placed at any location in a room, the mobile devices 230 to 260 placed in the same room can receive power from the pod-type base station 210.

Although the wireless charging systems 100 and 200 are illustrated using the mobile devices shown in FIGS. 1 and 2 above, they may also provide wireless power to any types of portable devices such as tablet computers, portable music players, portable video players, telephones, remote controls for electronic devices, etc. As used herein, the term "wireless coupling" refers to any type of wireless communication adapted to provide power wirelessly employing an electric field radiation, magnetic field induction, magnetic field resonance, electromagnetic field radiation, micro-wave field, laser, etc. without the use of a physical connection (e.g., electric wire). In some embodiments, the charging systems 100 and 200 may be employed to provide power wirelessly to a load associated with charging a battery in a mobile device and/or supplying power directly to a mobile device for operation. The charging systems 100 and 200 may employ a power transmitter in the base station 110 or 210 and a power receiver for each of the mobile devices 130 to 160 and 230 to 260.

Figure 3:
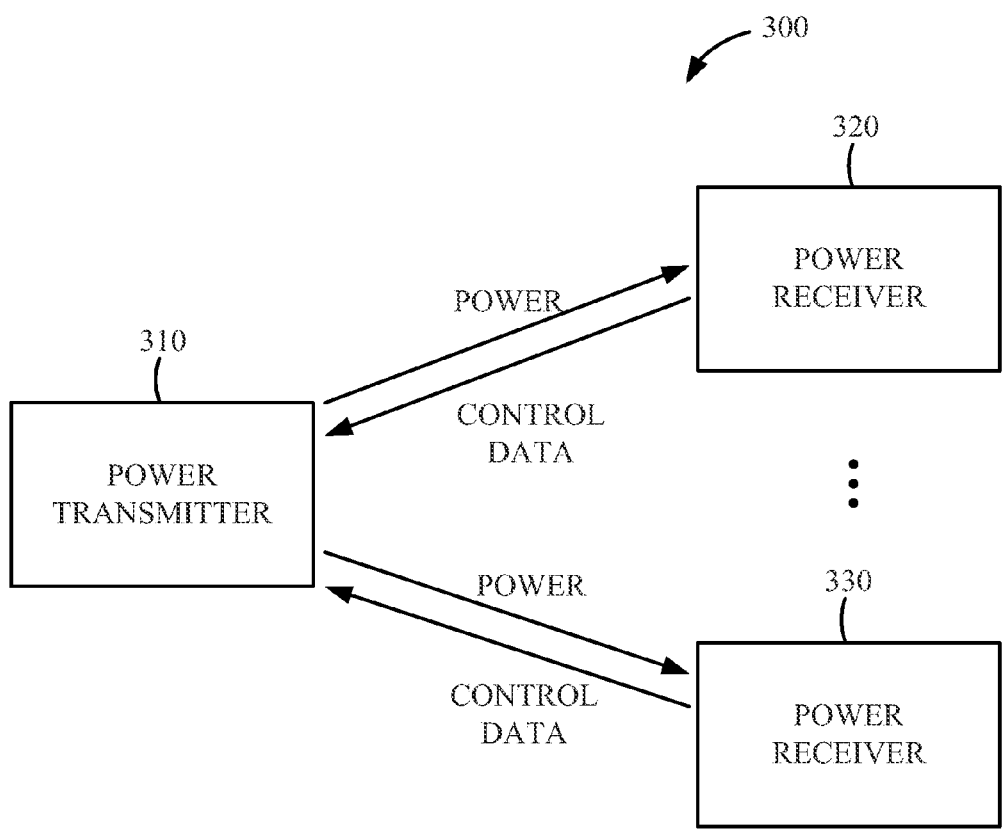
FIG. 3 illustrates a block diagram of a wireless charging system for transmitting control data from a plurality of power receivers to a power transmitter to control the power transmitted from the power transmitter according to one embodiment.

FIG. 3 illustrates a block diagram of a wireless charging system 300 including a power transmitter 310 and a plurality of power receivers 320 to 330, each of which is provided in a mobile device, according to one embodiment. The power transmitter 310 and the power receivers 320 to 330 are wirelessly coupled for power transfer from the transmitter 310 to the receivers 320 to 330.

In this configuration, the power transmitter 310 transmits power wirelessly via the wireless coupling to the power receivers 320 to 330. On the other hand, the power receivers 320 to 330 are configured to generate control data that can be used by the power transmitter 310 to adjust the power transmitted to the power receivers 320 to 330 via the wireless coupling. In one embodiment, each of the power receivers 320 to 330 may monitor the power being received from the power transmitter 310, the status of a power storage device (e.g., battery) to which the power receiver is coupled, information on a mobile device in which the power receiver is used, etc., and generate control data that can be used by power transmitter 310 to adjust the power supplied to the power receivers 320 to 330. The power receiver 320 or 330 may be provided internally within a mobile device or as an external adapter that can be coupled to the internal circuitry of a mobile device for receiving power from the power transmitter 310.

In some embodiments, the power receivers 320 to 330, depending on the hardware configuration and the current status of a power storage device, may each require a different level of power from the power transmitter 310 based on the load requirement for each of the power receivers 320 to 330. For example, the power receivers 320 and 330 may be used in different types of mobile devices that require different power levels such as 2 Watts (W) and 1.5 W, respectively. Given a specified power transmitted from the power transmitter 310, the power receivers 320 to 330 may each receive different levels of power according to various factors, such as the distance from or orientation with respect to the power transmitter 310, and individual physical characteristics of the power receivers 320 to 330 or the mobile devices in which the receivers 320 to 330 are used (e.g., the size and the material of the power receivers 320 to 330 or the mobile devices). For example, if the power transmitter 310 transmits 4 W of total power through the wireless coupling, the power receivers 320 and 330 may receive 2.5 W and 0.5 W, respectively, while the remaining 1 W may be lost in transmission.

The power receivers 320 to 330 may each generate control data based on the power being received from the power transmitter 310 and the power requirement for a load. In one embodiment, each of the power receivers 320 to 330 may be configured to generate control data indicating the power being received via the wireless coupling and the actual power needed. Each of the power receivers 320 to 330 may also be configured to generate control data that includes an instruction to increase or decrease the power transmitted from the power transmitter 310 based on the power received and the power actually needed.

Based on the control data from one or more receivers 320 to 330, the power transmitter 310 adjusts the power transmitted to the power receivers 320 to 330 via the wireless coupling. The power transmitter 310 may initially transmit a specified level of power over the wireless coupling to the power receivers 320 to 330. Based on the control data received from the power receivers 320 to 330, the power transmitter 310 increases or decreases the level of total power transmitted through the wireless coupling. For example, in a case where the control data received from the power receivers 320 and 330 includes a request to increase power from the power transmitter 310, which indicates that both power receivers 320 and 330 are receiving less power than required, the power transmitter 310 may increase the level of power to be transmitted to the power receivers 320 and 330. On the other hand, if the control data received from the power receivers 320 and 330 includes a request to decrease power from the power transmitter 310, which indicates that both power receivers 320 and 330 are receiving more power than needed, the power transmitter 310 may decrease the level of power to be transmitted to the power receivers 320 and 330. In case where only some of the receivers 320 to 330 receive less power than required, while the rest of the power receivers 320 to 330 receive adequate or more power than needed, the power transmitter 310 may adjust the level of transmit power according to the power requirements of one of the power receivers 320 to 330.

In some embodiments, the power transmitter 310 may determine a transmit power level based on a power management policy that includes one or more predefined priority conditions or a priority level associated with each of the power receivers 320 to 330. In one embodiment, the power management policy may include a fast charging mode, a low power mode, a high power mode, etc., or any combination thereof. Among the priority conditions, the priority policy may prioritize one or more of the conditions in a predefined order such that the power to be transmitted can be determined according to the priority policy. For example, when the priority policy is set to a priority condition of low power mode (e.g., to save transmission power), the power transmitter 310 may determine the transmission power level by determining the lowest power level needed by the power receivers 320 and 330.

Specifically, if the power receiver 320 needs 1 W of power while the power receiver 330 needs 2 W of power, the power transmitter 310 may set the transmit power level to 1 W of power, which is the lower power value. Conversely, in a high power mode, the power transmitter 310 may set the transmit power level to 2 W of power. In the low power mode, the power loss due to dissipation or excess power supply may be minimized while in the high power mode, the charging time for the power receivers is reduced.

In some embodiments, the transmit power may be supplied automatically via the wireless coupling among the power receivers 320 to 330. For example, a magnetic resonance wireless coupling has a characteristic of automatically supplying the required transmit power among the power receivers 320 and 330. Specifically, the resonant relationship between the power transmitter 310 and the power receivers 320 and 330 allows excess power from one of the power receivers 320 and 330 to be automatically provided to the other receiver. When the receiver 320 receives less power than required, the power transmitter 310 may increase the transmit power regardless of the power received by the other receiver 330. As the power transmitter 310 increases the transmit power beyond the level needed by one of the receivers 320 and 330, the excess power from the receiver is automatically provided to the other receiver. Accordingly, the excess power received by one or more power receivers may be provided to other power receivers that are receiving less power than required.

Figure 4:
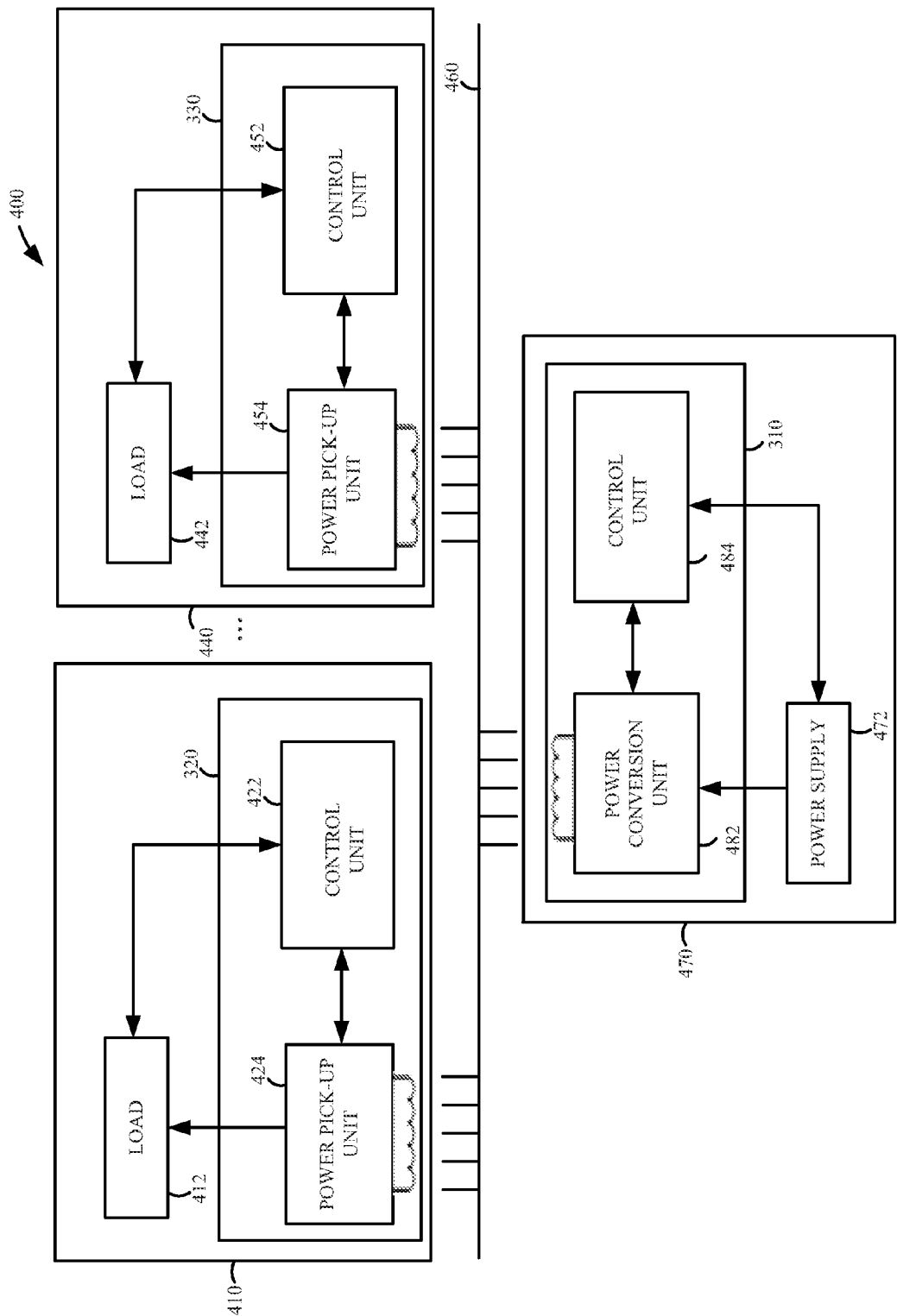
FIG. 4 illustrates a more detailed block diagram of a wireless charging system configured to control power transmitted from a base station to mobile devices according to one embodiment.

FIG. 4 illustrates a detailed block diagram of the wireless charging system 400 including the power transmitter 310 and the power receivers 320 and 330 for controlling power transmitted from a base station 470 to mobile devices 410 and 440 via a wireless coupling 460 according to one embodiment. In the wireless charging system 400, the base station 470 includes a power supply 472 and the power transmitter 310, which includes a power conversion unit 482 and a control unit 484. The power supply 472 supplies power to the power conversion unit 482, which provides power to the mobile devices 410 and 440 via the wireless coupling 460 under the control of the control unit 484.

In the charging system 400, the mobile device 410 includes a load 412 and a power receiver 320, which is configured to receive power from the base station 470 and transmit control data to the base station 470. The load 412 is associated with charging a battery in the mobile device 410 and/or supplying power directly to the mobile device 410 for operation, and may include a battery to be charged or any circuitry (e.g., memory, CPU, etc.) to be operated with electrical power.

The power receiver 320 includes a power pick-up unit 424 and a control unit 422. The power pick-up unit 424 may be configured to receive power via the wireless coupling 460 from the power conversion unit 482 of the power transmitter 310, and provide the received power to the load 412 and the control unit 422.

The control unit 422 may be configured to generate control data to be transmitted to the base station 470 for controlling the power transmitted from the base station 470. In one embodiment, the control unit 422 may be configured to sense a voltage of the power received from the power transmitter 310. Based on the sensed voltage of the received power, the control unit 422 may determine whether the power needs to be reduced or increased for the load 412 and generate control data to adjust the power transmitted from the power transmitter 310. The control unit 422 may also be configured to sense a status of the load 412 such as a charging status of a battery or the mobile device 410. Based on the status of the load 412, the control unit 422 may generate control data including information indicative of the charging status of the load 412.

The control unit 422 provides the generated control data to the power pick-up unit 424, which transmits the control data to the base station 470 through the wireless coupling 460 between the power pick-up unit 424 of the power receiver 320 and the power conversion unit 482 of the power transmitter 310.

In the base station 470, the power conversion unit 482 is configured to receive the control data from the power receiver 320 via the wireless coupling 460 and provide the control data to the control unit 484. Based on the control data, the control unit 484 may control the power conversion unit 482 to adjust the power transmitted to the mobile device 410 via the wireless coupling 460. The mobile device 440 includes similar units 442, 330, 452, and 454, which perform similar functions as the structures 412, 320, 422, and 424, respectively, of the mobile device 410, and thus, a description thereof is omitted.

Figure 5:
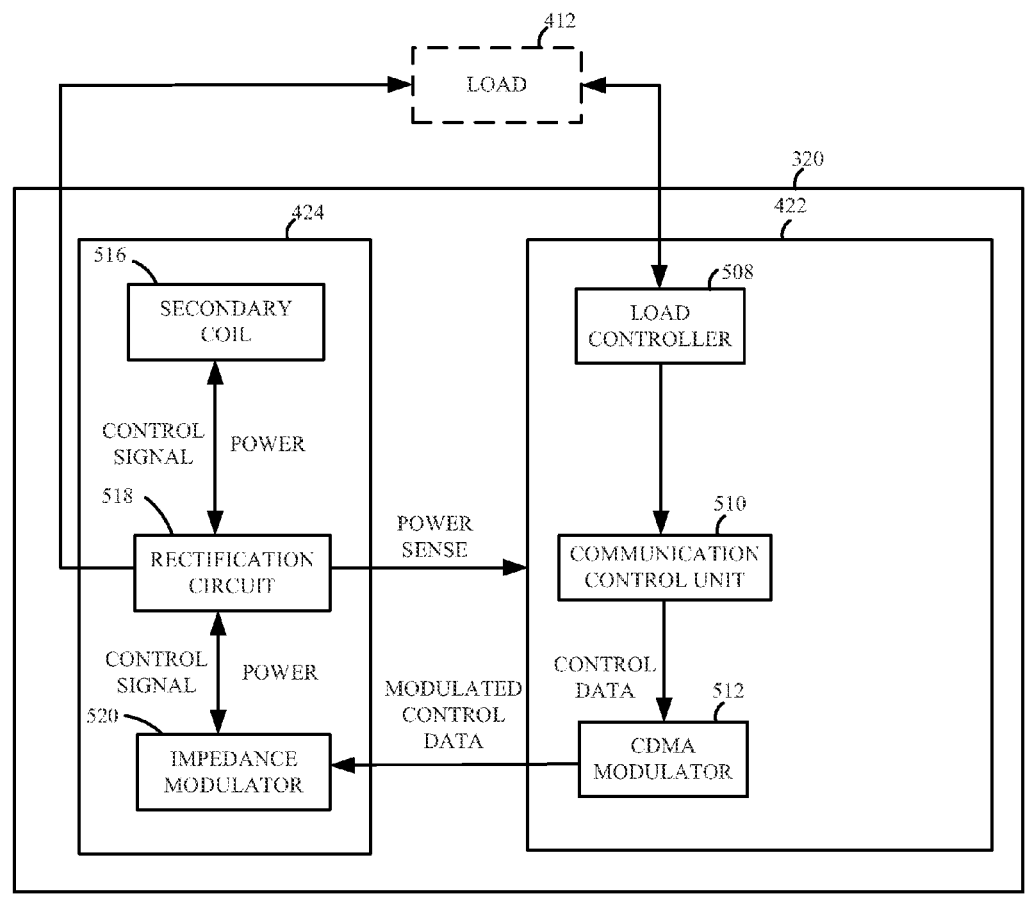
FIG. 5 illustrates a more detailed block diagram of a power receiver of a mobile device configured to generate and transmit control data based on power received from a power transmitter and status information of a load according to one embodiment.

FIG. 5 illustrates a more detailed block diagram of the power receiver 320 of the mobile device 410 for generating and transmitting control data based on power received from the power transmitter 310 and status information of the load 412 according to one embodiment. As described above, the power receiver 320 may include the control unit 422 and the power pick-up unit 424. The power pick-up unit 424 may include a secondary coil 516, a rectification circuit 518, and an impedance modulator 520. The secondary coil 516 is configured to provide the wireless coupling 460 with a primary coil of the power transmitter 310. Accordingly, the power from the power transmitter 310 may be received via the secondary coil 516 of the power-pick up unit 424. The rectification circuit 518 may transform the received power from the power transmitter 310 to DC power and provide the power to the load 412, the control unit 422, and the impedance modulator 520.

In the power receiver 320, the control unit 422 may include a load controller 508, a communication control unit 510, and a CDMA modulator 512. The load controller 508 may sense a status of the load 412 such as the status of a battery or the mobile device, and may control the load 412 based on the status of the load 412. For example, if the status of the battery is low, the load controller 508 may shift the CPU of the mobile device into a low-power mode.

The communication control unit 510 in the control unit 422 may receive information indicative of a status of the load from the load controller 508, and generate control data for controlling power transmitted from the base station 470 based on the information. For example, if a battery status of a cellular phone is full, the communication control unit 510 may generate control data to stop power transmission from the base station 470. Further, the communication control unit 510 may be configured to sense a voltage of the power received in the power pick-up unit 424 and determine whether the power needs to be adjusted. Based on the adjustment needed, the communication control unit 510 may generate control data to control adjustment of the power from the power transmitter 310. The control data is then provided to the CDMA modulator 512, which modulates the control data with a predefined spreading code.

The CDMA modulator 512 provides the modulated control data to the impedance modulator 520 in the power pick-up unit 424. The impedance modulator 520 may transmit the modulated control data to the power transmitter 310 by modulating the power, which is being received through the secondary coil 516 and the rectification circuit 518, via the wireless coupling 460.

Figure 6:
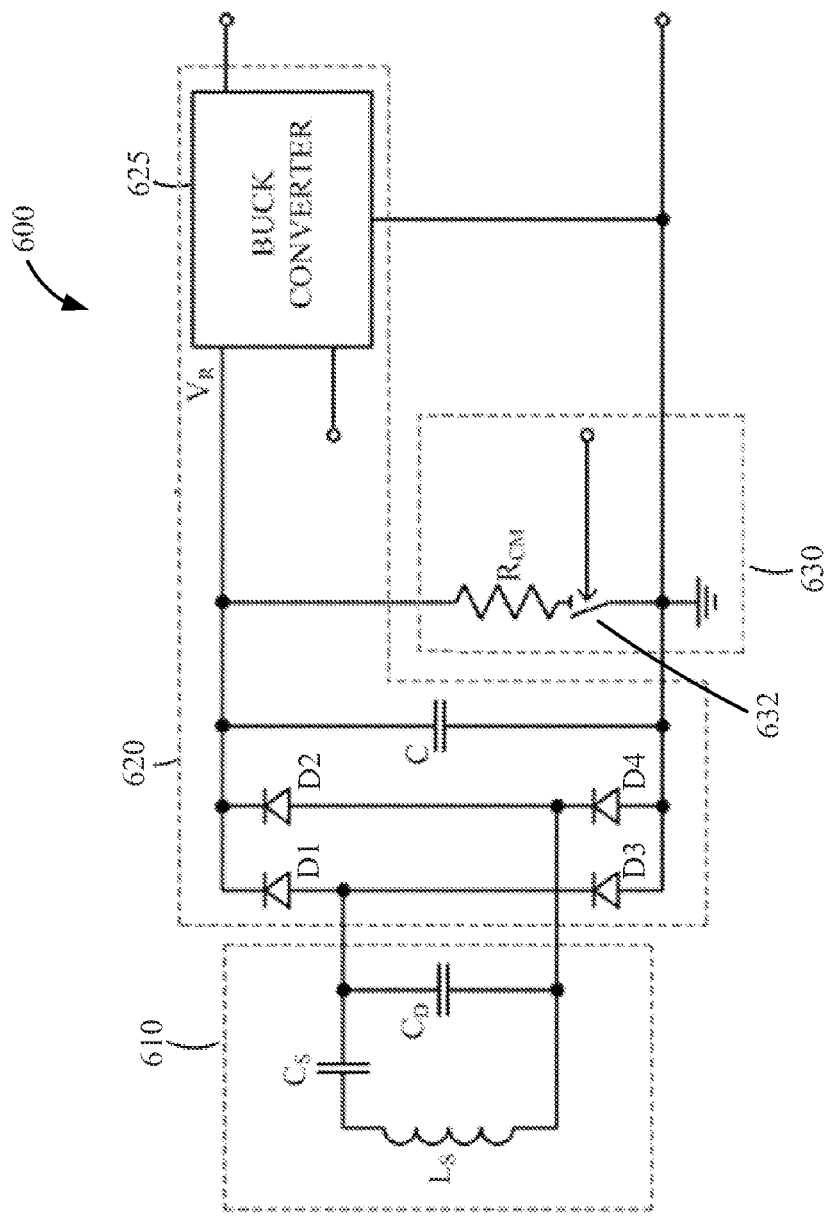
FIG. 6 illustrates a circuit diagram of a power pick-up unit in a power receiver for receiving power from a power transmitter and transmitting control data to the power transmitter according to one embodiment.

FIG. 6 illustrates a circuit diagram 600 of the power pick-up unit 424 in the power receiver 320 for receiving power from the power transmitter 310 and transmitting control data to the power transmitter 310 according to one embodiment. The power pick-up circuitry 600 may include a resonance circuitry 610, a rectification circuitry 620, and an impedance modulator 630. The resonance circuitry 610 may include a secondary coil $L_S$ and a pair of capacitors $C_S$ and $C_D$ to receive power from the power transmitter 310 by matching or nearly matching the resonance frequency between a primary coil of the power transmitter 310 and the secondary coil $L_S$ of the resonance circuitry 610 of the power receiver 320. The resonance frequency of the secondary coil $L_S$ is based on the inductance of the secondary coil $L_S$ and the capacitances $C_S$ and $C_D$. Accordingly, by modulating the inductance of the secondary coil $L_S$ and the capacitances $C_S$ and $C_D$, the resonance frequency between the primary coil of the power transmitter 310 and the secondary coil $L_S$ of the resonance circuitry 610 of the power receiver 320 can be matched, and power can be transferred wirelessly. The received power from the resonance circuitry 610 is supplied to the rectification circuitry 620. The rectification circuitry 620 may include four diodes D1 to D4 and one capacitor C to convert an AC sine-wave to a full-wave pulsating DC power as a full-wave bridge rectifier and a buck converter 625 to reduce the DC power to a controllable amount.

The impedance modulator 630 includes a resistor $R_{CM}$ in series with a switch 632 to transmit the modulated control data to the power transmitter 310. Based on the modulated control data from the CDMA modulator, the impedance modulator 630 modulates the impedance of the circuitry 600 by connecting and disconnecting (i.e., toggling) the switch 632 while the power is being transferred via the wireless coupling from the primary coil of the power transmitter 310 to the secondary coil $L_S$ of the resonance circuitry 610 of the power receiver 320. For example, if the impedance of the impedance modulator 630 is modulated by toggling the switch 632, the total impedance of the circuitry 600 including the impedance of the impedance modulator 630 will be changed. As the total impedance is changed, the amplitude of the wireless coupling may be modulated between two different levels (i.e., a high state and a low state) since the amplitude of the wireless coupling may depend on the value of total impedance of the circuitry 600. Accordingly, the power, which is being transmitted via the wireless coupling 460 from the power transmitter 310 to the power receiver 320, is modulated according to the modulation of the wireless coupling 460 to transmit the control data from the power receiver 320 to the power transmitter 310.

Figure 7:
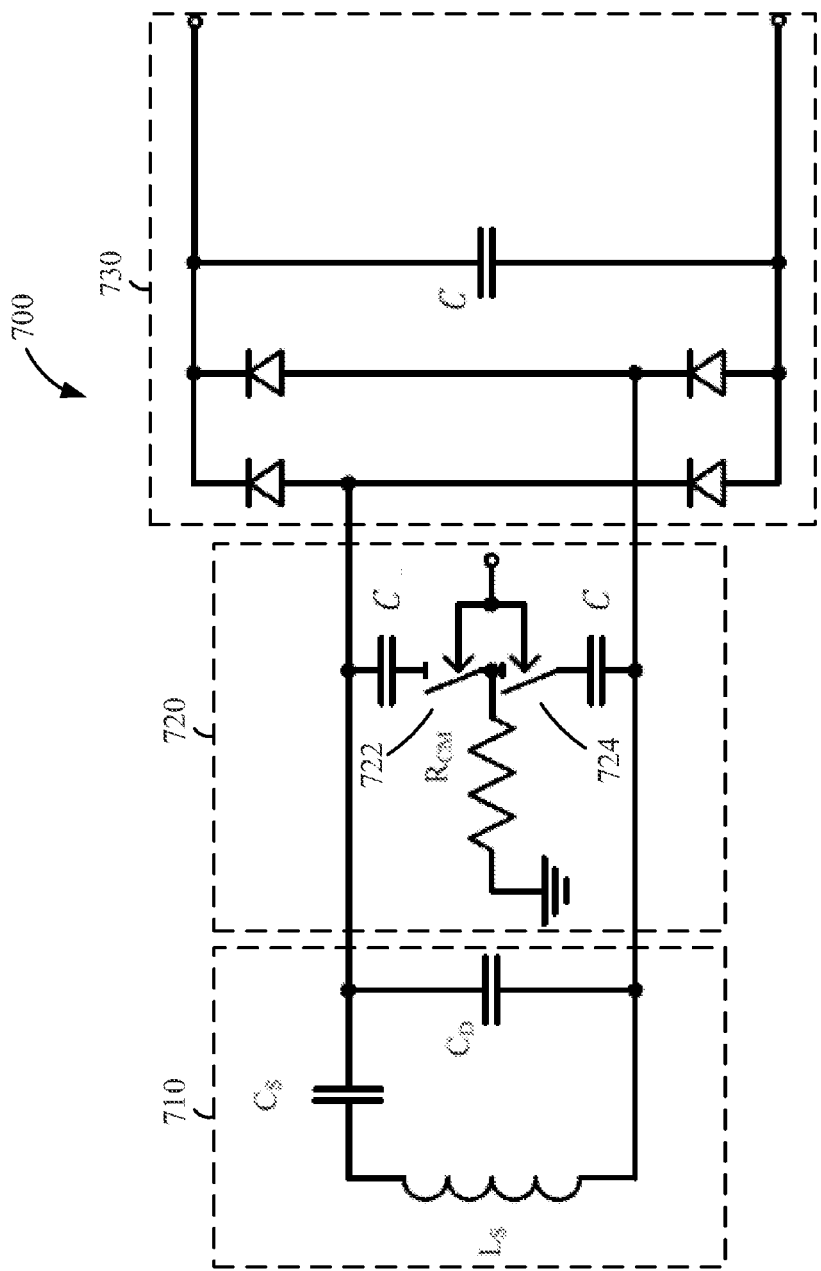
FIG. 7 illustrates another circuit diagram of a power pick-up unit in a power receiver for receiving power from a power transmitter and transmitting control data to the power transmitter according to one embodiment.

FIG. 7 illustrates a circuit diagram 700 of the power pick-up unit 424 in the power receiver 320 according to another embodiment. The power pick-up circuitry 700 includes a resonance circuitry 710 and a rectification circuitry 730, which perform functions similar to the resonance circuitry 610 and rectification circuitry 620 of the circuitry 600, and thus, a description thereof is omitted. The power pick-up circuitry 700 may also include an impedance modulator 720 including a resistor $R_{CM}$ coupled in series with a pair of switches 722 and 724 to transmit modulated control data to the power transmitter 310 by modulating the power being received from the power transmitter 310 by toggling the switches 722 and 724.

Figure 8:
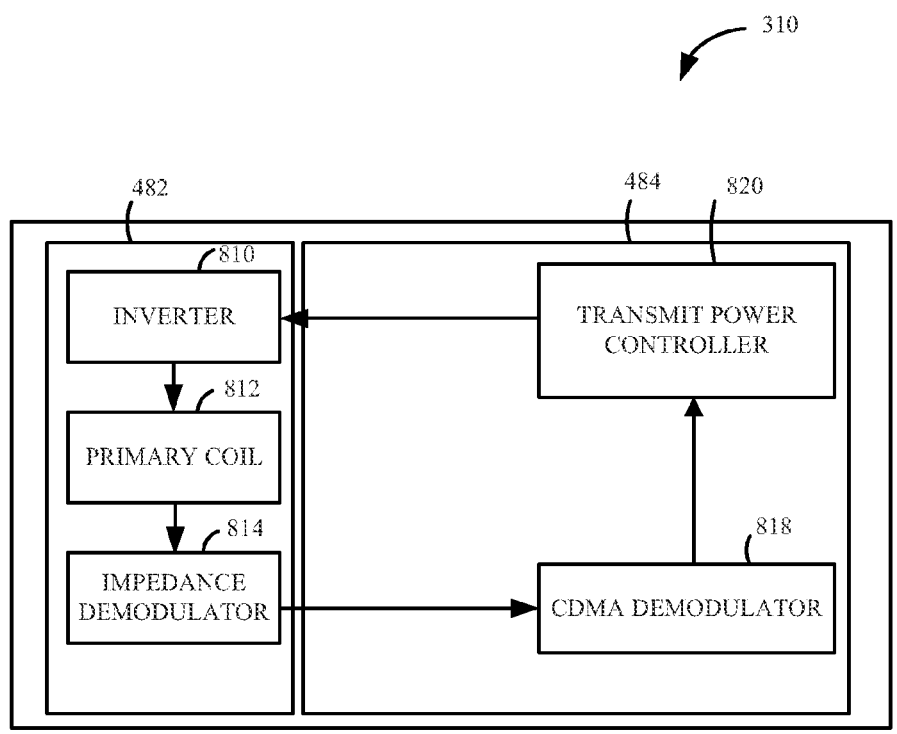
FIG. 8 illustrates a more detailed block diagram of a power transmitter of a base station configured to receive control data from a power receiver and adjust power transmitted to the power receiver according to one embodiment.

FIG. 8 illustrates a more detailed block diagram of the power transmitter 310 of the base station 470 for receiving control data from the power receivers 320 to 330 and adjusting the power transmitted to the power receivers 320 to 330 according to one embodiment. As described above, the power transmitter 310 includes the power conversion unit 482 and the control unit 484. The power conversion unit 482 may include an inverter 810, a primary coil 812, and an impedance demodulator 814 (e.g., a current sensor). The inverter 810 may convert a DC input power to an AC power and supply the converted power to the primary coil 812. The impedance demodulator 814 may sense or detect the modulation of the power of the primary coil 812 to receive the control data from the power receivers 320 to 330. For example, if the control data to be transmitted is "101," the impedance modulator of the power receiver 320 may modulate the power which is being transmitting via the wireless coupling by modulating the total impedance of the power receiver 320 to a "high state," a "low state," and a "high state." As such, the power, which is being transmitting from the primary coil 812 of power transmitter 310, is modulated and a current or a voltage of the primary coil 812 of the power transmitter 310 changes accordingly. As the current or a voltage of the primary coil 812 of the power transmitter 310 is changed, the impedance demodulator 814 may detect the change of the current or the voltage to generate the control data "101," which is provided to the control unit 484.

The control unit 484 may include a CDMA demodulator 818 and a transmit power controller 820 to control the power conversion unit 482 based on the received control data. The CDMA demodulator 818 is configured to receive modulated control data from the impedance demodulator 814 of the power conversion unit 482 and demodulate the modulated control data to the original control data with a predefined spread spectrum code, which is the same code used in the CDMA modulator 512 of the power receivers 320 to 330. Based on the control data from the CDMA demodulator 818, the transmit power controller 820 may generate a control signal to control the inverter 810.

Specifically, from the control data received from the CDMA demodulator 818, the transmit power controller 820 may determine the power to be received by each of the power receivers. Based on the power information in the control data, the transmit power controller 820 may determine a transmission power level to be transmitted to the power receivers 320 to 330 according to a power management policy or the type of wireless coupling (e.g., magnetic induction, magnetic resonance, etc.), and generate a control signal to adjust the power being transmitted to the transmission power level. Then, the inverter 810 may receive the control signal from the transmit power controller 820 and adjust the power being transmitted through the primary coil 812 based on the control signal including information of the transmission power level.

Figure 9:
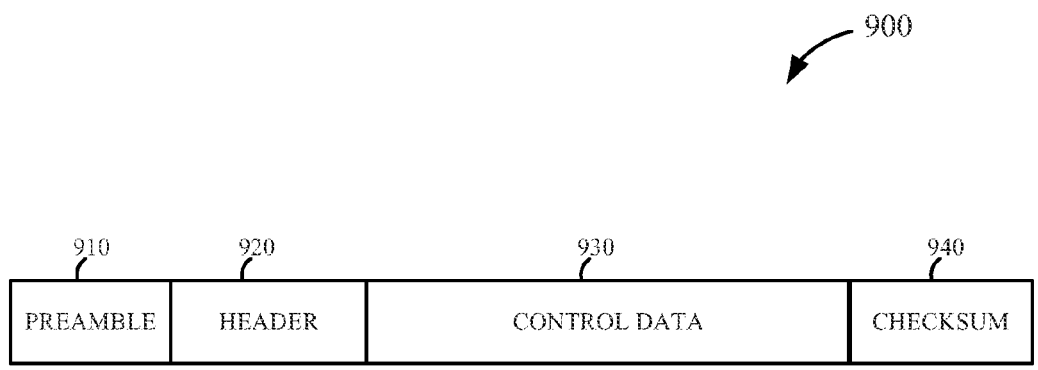
FIG. 9 illustrates a control data packet generated and transmitted by the control unit for adjusting power transmitted from the power transmitter according to one embodiment.

FIG. 9 illustrates a control data packet 900 generated and transmitted by the communication control unit 510 in the power receiver 320 for adjusting power transmitted from the power transmitter 310 according to one embodiment. In the communication control unit 510, the generated control data may be packetized into a packet 900, which includes a preamble 910, a header 920, control data 930, and a checksum 940. The preamble 910 may be used to detect existence of a packet and to synchronize a receiving phase when the power transmitter 310 receives the packet 900. The header 920 may indicate a start portion of the packet and packet classification. The control data 930 corresponds to the control data described above and may include data such as status data of the load 412 or mobile device, information for controlling power transmission from the power transmitter 310, etc. The checksum 940 may include a checksum or error correcting code to verify packet integrity or to correct errors when the packet 900 is received with a correctable number of errors. Although the control data packet 900 is illustrated as having the above described fields (i.e., preamble 910, header 920, control data 930, and checksum 940), it may also include any suitable fields for transmitting control data via the wireless coupling 460 from the power receiver 320 to the power transmitter 310.

Figure 10:
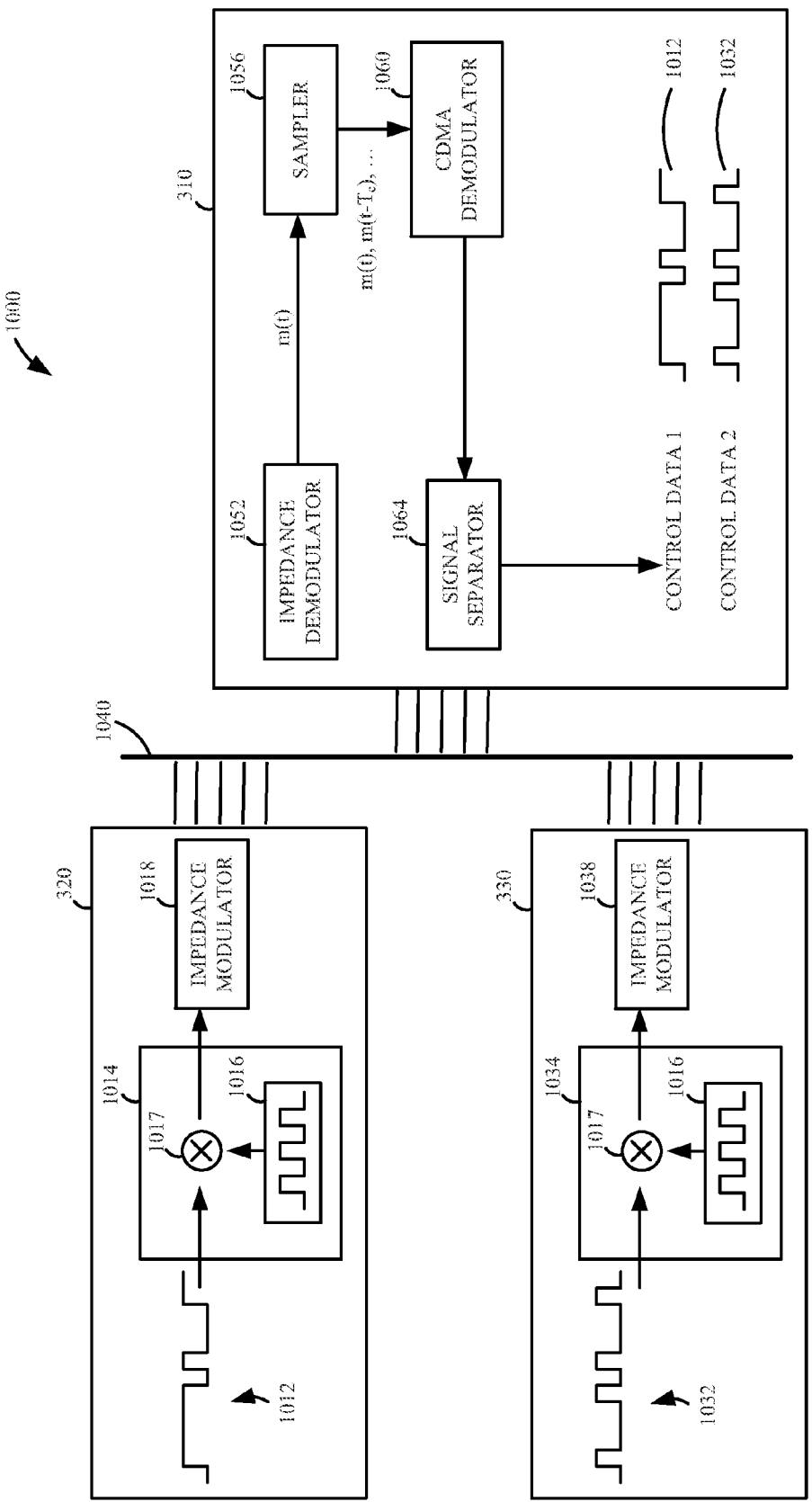
FIG. 10 shows control data transmission from a plurality of power receivers to a power transmitter by modulating and demodulating the control data with a spreading code according to one embodiment.

FIG. 10 shows transmission of control data 1012 and 1032 from a pair of power receivers 320 and 330, respectively, to a power transmitter 310 by modulating and demodulating the control data 1012 and 1032 with a predefined spreading code 1016 according to one embodiment. As described above, each of the power receivers 320 and 330 may generate original control data 1012 and 1032, respectively, for controlling power transmission from the power transmitter 310. In one embodiment, the generated original control data 1012 and 1032 may be modulated by the spread spectrum code 1016 in the CDMA modulator 1014.

Specifically, in the CDMA modulator 1014, the original control data 1012 may be modulated by the spreading code 1016 (e.g., pseudorandom code) with an XOR (exclusive OR) 1017 operation. The impedance modulator 1018 of the power receiver 320 receives the modulated control data from the CDMA modulator 1014 and transmits the modulated control data to the power transmitter 310 through a wireless coupling 1040 (e.g., magnetic resonance) between the power receiver 320 and the power transmitter 310 by modulating the power being transmitted via the wireless coupling 1040. In this case, the modulation range of the wireless coupling 1040 (e.g., a difference between maximum and minimum amplitudes of the magnetic field) for transmitting the modulated control data can be reduced since the spreading code 1016 may spread the original control data 1012 of a narrowband frequency over a wideband frequency. Accordingly, by reducing the modulation range of the wireless coupling 1040 when transmitting the modulated control data to the power transmitter 310, the control data transmission may not need to interrupt the power transmission through the wireless coupling 1040.

In one embodiment, the power receivers 320 and 330 may transmit the modulated control data to the power transmitter 310 simultaneously or concurrently. In this case, the CDMA modulators 1014 and 1034 of the power receivers 320 and 330 may use the same spreading code 1016 to modulate the original control data 1012 and 1032, and the power transmitter 310 may use the same spreading code 1016 to demodulate the modulated control data. Further, as described above, a control data transmission from the power receiver 320 may not need to interrupt a control data transmission from the power receiver 330 since the modulation range of the wireless coupling 1040 for transmitting the control data can be narrowed by modulating the control data with the spreading code 1016. It will be appreciated that functions of the CMDA modulator 1034 and impedance modulator 1038 of the power receiver 330 are performed in the same manner as the CMDA modulator 1014 and impedance modulator 1018 of the power receiver 320, and thus, a description thereof is omitted.

In the power transmitter 310, the impedance demodulator 1052 receives the modulated control data from the plurality of power receivers 320 and 330 by detecting the modulation of the power being transmitted via the wireless coupling 1040. The modulated control data may be provided to a sampler 1056 as a digital signal m(t) for synchronizing the modulated control data with the spreading code 1016. For example, as the digital signal m(t) is received, the sampler 1056 may sample the digital signal m(t) at a predefined sampling interval (e.g., $T_c$) to produce a series of sample data (e.g., m(t), m(t-$T_c$), m(t-$2T_c$), m(t-$3T_c$), etc.). In one embodiment, the sampling interval may be predefined to be sufficiently small to oversample the digital signal m(t). For example, if the sampling interval is $T_c/4$, the sampler 1056 may produce a series of sample data as m(t), m(t-$T_c/4$), m(t-$2T_c/4$), m(t-$3T_c/4$), m(t-$4T_c/4$), m(t-$5T_c/4$), etc. The sample data are then provided to the CDMA demodulator 1060 to be demodulated with the spreading code 1016.

As described above, the plurality of power receivers 320 and 330 may transmit the modulated control data to the power transmitter 310 simultaneously. In this case, the modulated control data from the power receiver 320 and the modulated control data from the power receiver 330 may be mixed or overlap with each other when the control data are transmitted to the power transmitter 310 since the control data are transmitted via the same wireless coupling 1040 between the power receivers 320 and 330 and the power transmitter 310. Thus, if the power receivers 320 and 330 transmit the modulated control data to the power transmitter 310 simultaneously, the power transmitter 310 may receive a mixed modulated control data signal, which includes both of the modulated control data from the power receivers 320 and 330. In such a case, the sampler 1056 samples the mixed modulated control data signal m(t) and provides sampled data to the CDMA demodulator 1060. Upon receiving the sample data, the CDMA demodulator 1060 may demodulate the sample data to recover the mixed original control data which includes both of the original control data 1012 and 1032. The mixed original control data is then provided to the signal separator 1064, which separates the mixed original control data into the original control data 1012 of the power receiver 320 and the original control data 1032 of the power receiver 330.

In one embodiment, the mixed original control data may be separated into the original control data 1012 and 1032 based on the time that the mixed original control data is initially received at the power transmitter 310. For example, if the bit duration of the original control data 1012 is T, the signal separator 1064 may determine a first bit of the mixed original control data as a first bit of the control data 1012. Then, the signal separator 1064 may determine a bit after time T from the first bit of the mixed original control data as a second bit of the control data 1012, and so on. In this manner, the signal separator 1064 can separate the control data 1012 from the mixed original control data. Given the time period T, it may be assumed that a bit detected within the period T after the detection of the first bit of the control data 1012 is a first bit of the control data 1032. Accordingly, the original control data 1032 may be separated from the mixed original control data by detecting data bits at regular time interval T from the first bit. Further, in separating the mixed control data, any suitable signal separation technique may be employed for this purpose. After separating the mixed control data into the original control data 1012 and 1032 corresponding to the power receivers 320 and 330, the power transmitter 310 may adjust power to be transmitted to the power receivers 320 and 330 based on the recovered original control data 1012 and 1032.

Figure 11:
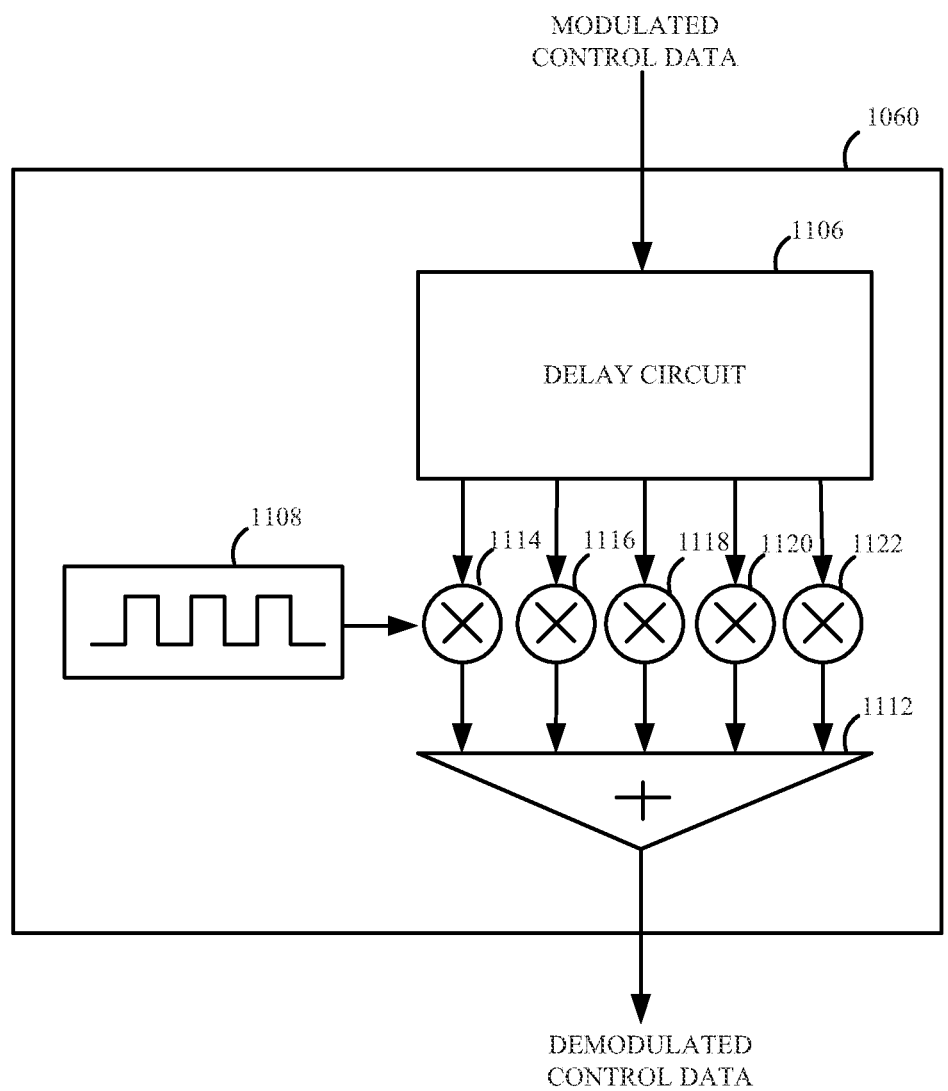
FIG. 11 illustrates a more detailed block diagram of a Code Division Multiple Access (CDMA) demodulator of a power transmitter for demodulating control data according to one embodiment.

FIG. 11 illustrates a more detailed block diagram of the CDMA demodulator 1060 in the power transmitter 310 for demodulating control data according to one embodiment. As described above, the CDMA demodulator 1060 may receive modulated control data from the impedance demodulator 1052 and sampler 1056. After receiving the modulated control data, the CDMA demodulator 1060 may delay the received control data through a delay circuit 1106 and provide the delayed data to XOR gates 1114, 1116, 1118, 1120, and 1122, which performs XOR operations with a spreading code 1108 for each delay line. A summer 1112 is configured to sum the results of the XOR operations to recover the demodulated control data by detecting high correlation values from the sum of the delay lines. In one embodiment, the summer 1112 may add a value of "1" if the value from an XOR operation is "1" and add a value of "−1" if the value from an XOR operation is "0." After the values have been summed in the summer 1112 as above, a detector (not shown) may determine a bit of the demodulated control data as "1" if the value from the summer 1112 exceeds a high threshold value and as "0" if the value from the summer 1112 is below a low threshold value. In this manner, the detector can detect high correlation values, which are above the high threshold value or below the low threshold value, to recover the demodulated control data based on the high correlation values. Since the high correlation value can be detected after demodulating with the spreading code 1108, noise having a value between the low threshold value and the high threshold value can be filtered out while the control data are demodulated.

Figure 12:
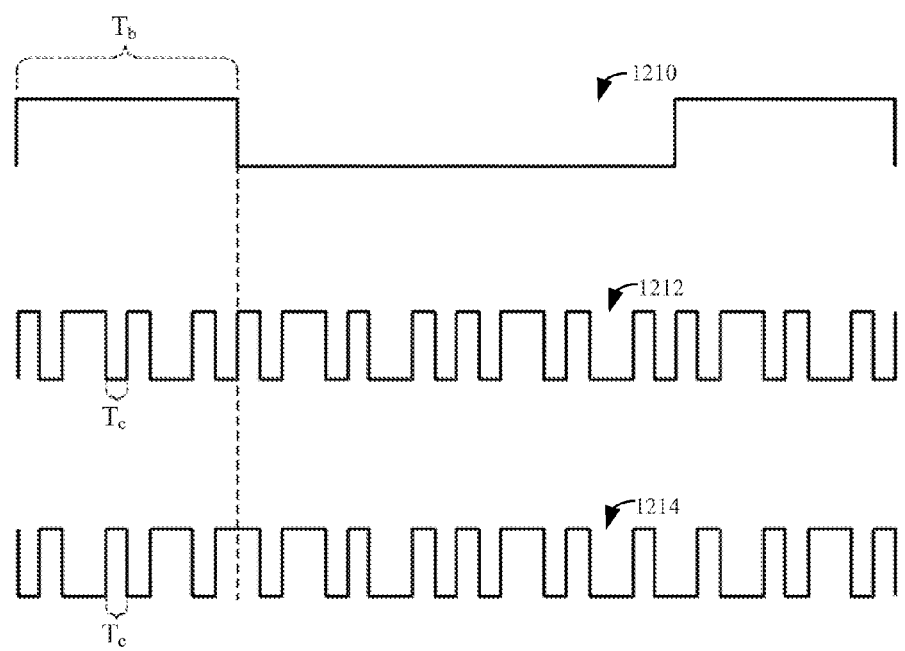
FIG. 12 shows a timing diagram of control data, a spreading code, and modulated control data according to one embodiment.

FIG. 12 shows a timing diagram of control data 1210, a spreading code 1212, and modulated control data 1214 according to one embodiment. In this diagram, the control data 1210 is represented with a bit stream "1001" with pulses of time duration $T_b$. For modulating the control data 1210, the spreading code 1212 is represented with a bit stream "1011010010 . . . 1011010010" with pulses of time duration $T_c$, which is shorter than the time duration $T_b$ of the control data 1210. The control data 1210 and the spreading code 1212 are XOR'ed to produce the modulated control data 1214 in a power receiver with pulses of time duration $T_c$.

The spreading code 1212 may be a short code, e.g., a periodic code with period $T_b$, as illustrated in FIG. 12, or a long code, e.g., an aperiodic code. In the case of a short code, each bit of the control data 1210 may be modulated with the same code (e.g., with code "1011010010"). In the case of a long code, each bit of the control data 1210 may be respectively modulated with different codes. Conversely, the modulated control data 1214 may be demodulated at a power transmitter by using the spreading code 1212. If the spreading code 1212 is a short code, each bit of the modulated control data 1214 may be modulated with the same code. On the other hand, if the spreading code is a long code, each bit of the modulated control data 1214 may be modulated with different codes.

Figure 13:
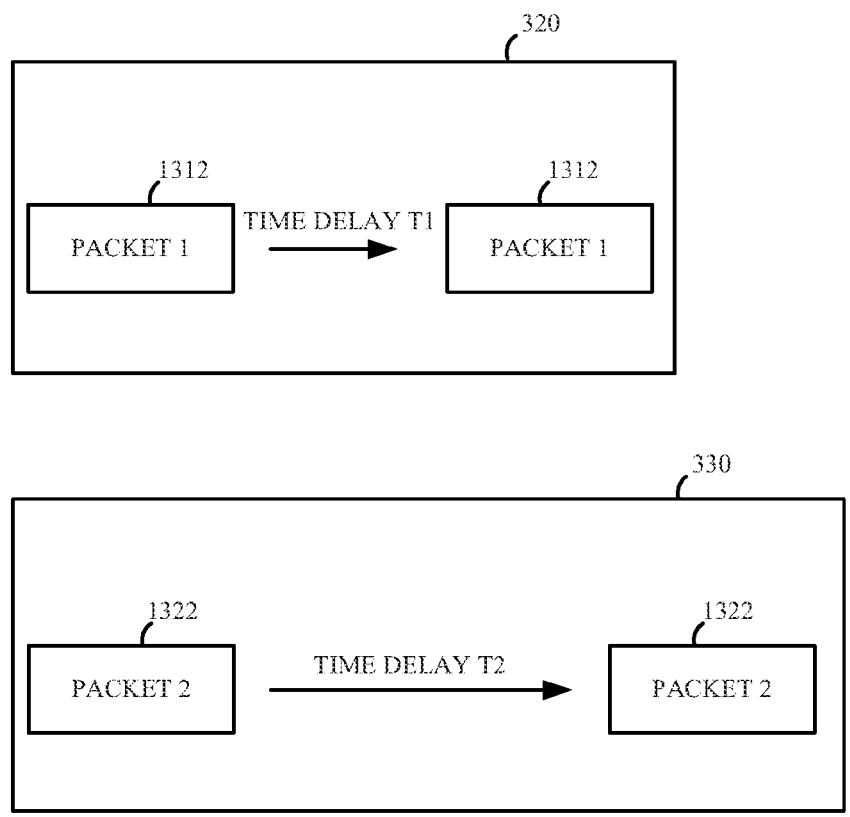
FIG. 13 shows control data transmission and retransmission after a delay to ensure packet delivery according to one embodiment.

FIG. 13 shows a diagram of control data transmission and retransmission after a time delay to ensure packet delivery according to one embodiment. As described above, the plurality of power receivers 320 and 330 may transmit control data as control data packets 1312 and 1322, respectively, to the power transmitter 310 simultaneously. In this case, if the power receivers 320 and 330 transmit the packets 1312 and 1322, respectively, to the power transmitter 310 at the exactly same start time or in a similar start time within a spreading chip duration, a collision between the packets 1312 and 1322 may arise, and thus, the power transmitter 310 may not be able to recover the transmitted packets 1312 and 1322. Although, the probability of a packet collision is typically low, in order to avoid the worst case, the power receivers 320 and 330 may be configured to retransmit the packets 1312 and 1322, respectively, to the power transmitter 310 regardless of whether a collision has occurred. Accordingly, the probability that the packets 1312 and 1322 are transmitted at the exactly same start time or in a similar start time within the spreading chip duration will be further reduced. In retransmitting the packets 1312 and 1322 to avoid a packet collision, a random time or unique ID seeded back-off techniques may be employed. For example, the power receivers 320 and 330 may initially transmit the packets 1312 and 1322, respectively. Then, the power receiver 320 may retransmit the packet 1312 after a time delay $T_1$ and the power receiver 330 may retransmit the packet 1322 after a time delay $T_2$. The time delays $T_1$ and $T_2$ may be randomly generated when the power receivers 320 and 330 retransmit the packets 1312 and 1322 (i.e., random time technique), respectively. Alternatively, the time delays $T_1$ and $T_2$ may be predetermined for identification numbers assigned to the power receivers 320 and 330, respectively (i.e., unique ID seeded back-off technique).

The retransmissions may be performed by using any suitable technique for retransmitting data packets. In one embodiment, the power receivers 320 and 330 may be configured to retransmit the packets 1312 and 1322, respectively, only when the packets 1312 and 1322 include specific information such as power status information. In this case, other data packets such as power feedback packets, which are sent to the power transmitter 310 periodically for adjusting power, may be transferred once regardless of whether a packet collision occurs, since another data packet can be sent and recovered in the next transmission. In one embodiment, the power receiver may retransmit the packet a predetermined number of times.

Figure 14:
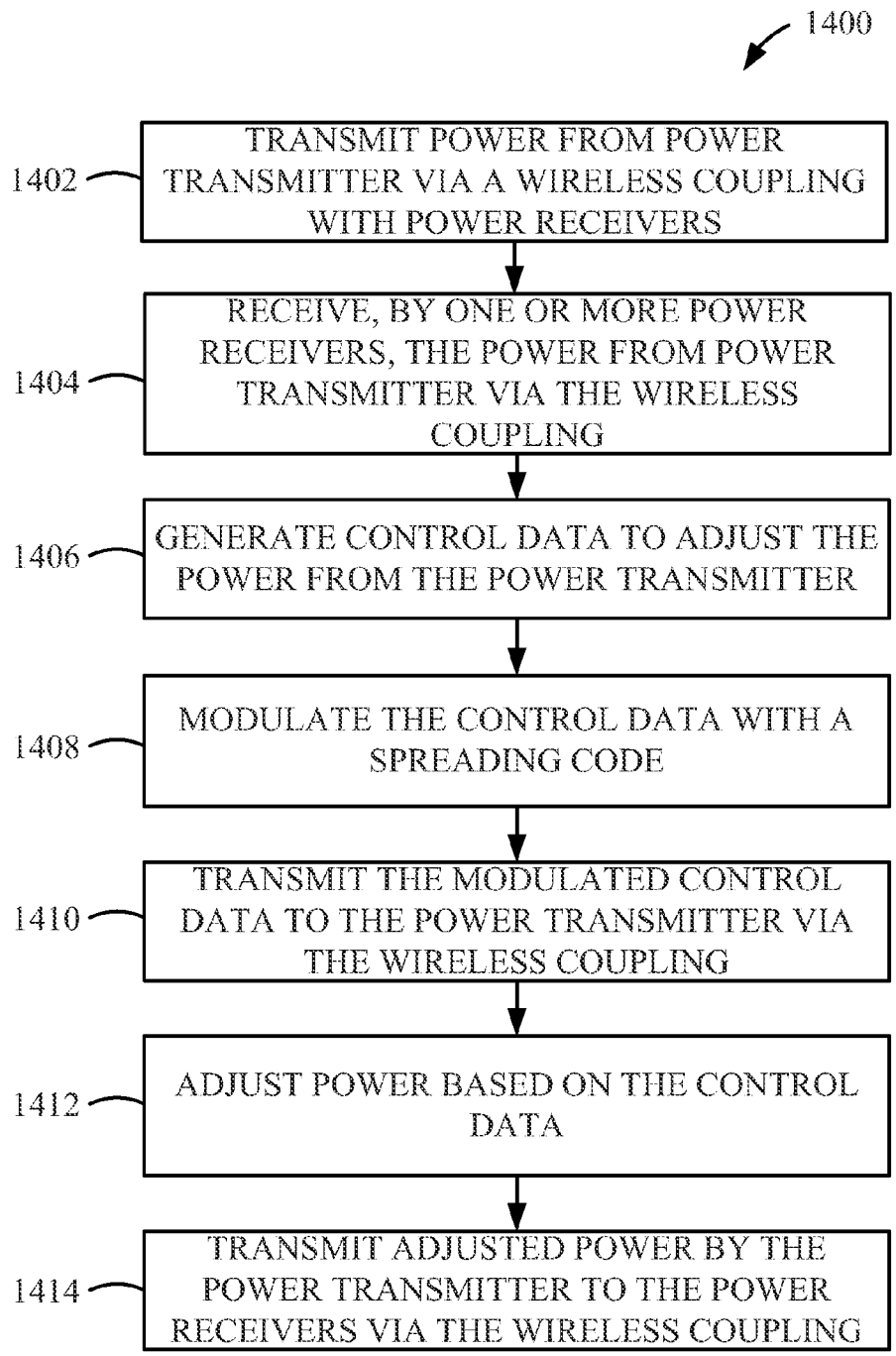
FIG. 14 illustrates a flowchart of a method for transmitting control data from a plurality of power receivers to a power transmitter to control the power transmitted from the power transmitter according to one embodiment.

FIG. 14 illustrates a flowchart of a method 1400 for transmitting control data from a plurality of power receivers to a power transmitter for controlling power transmitted from the power transmitter according to one embodiment. In this method, the power transmitter may transmit power via a wireless coupling between the power transmitter and the power receivers, at 1402. Then, at 1404, the power receivers may receive the power from the power transmitter via the wireless coupling. During the power transmission from the power transmitter to the power receivers, at least one of the power receivers may generate control data to adjust the power from the power transmitter, at 1406. After generating the control data, the power receiver may modulate the control data with a spreading code, at 1408. At 1410, the power receiver may transmit the modulated control data to the power transmitter via the wireless coupling. Upon receiving the modulated control data from the power receiver, the power transmitter may demodulate the control data and adjust the power to be transmitted to the power receivers based on the control data, at 1412. Then, at 1414, the power transmitter may transmit the adjusted power to the power receivers via the wireless coupling. The above operations described with reference to FIG. 14 may also be performed in the power transmitter 310 and the power receivers 320 to 330 using the above described units.

In general, any device described herein is indicative of various types of devices, such as a wireless phone, a cellular phone, a portable computer, a music player, a communication personal computer, a PDA, etc. A device may have various names, such as access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof. Further, the wireless power controlling techniques described herein are implemented by various means.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosures herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For firmware and/or software implementations, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not as a limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although the subject matter has been described in language specific to structural features and/or methodological acts, it is to be understood that the subject matter defined in the appended claims is not limited to the specific features or acts described above. Rather, the specific features and acts described above are disclosed as examples.

What is claimed is:
1. A power receiver, comprising:
a power pick-up unit configured to receive power from a power transmitter via a wireless coupling with the power transmitter; and
a control unit configured to adjust the power received from the power transmitter by determining and transmitting modulated control data to the power transmitter via the power pick-up unit,
wherein the power pick-up unit is further configured to retransmit the same modulated control data without determining additional control data and regardless of whether the modulated control data is received by the power transmitter conditioned on the modulated control data being determined by the control unit to include power status information.
2. The power receiver of claim 1, wherein:
the control unit comprises a first modulator, and
the modulated control data comprises a spreading code that is shared by the first modulator and a second modulator of a second power receiver.

3. The power receiver of claim 1, wherein:
the power pick-up unit is further configured to provide the received power to a load, and
the control unit is further configured to determine the modulated control data based on at least one of a status of the load or the received power.
4. The power receiver of claim 1, wherein the control unit comprises a first modulator configured to modulate data with a shared spreading code to determine the modulated control data.
5. The power receiver of claim 4, wherein the power pick-up unit comprises a second modulator configured to modulate the power being received via the wireless coupling.
6. The power receiver of claim 4, wherein the power pick-up unit comprises an impedance modulator configured to modulate an impedance of the power pick-up unit based on the modulated control data.
7. The power receiver of claim 1, wherein:
the control unit is further configured to modulate data with a shared spreading code to determine the modulated control data, and
the shared spreading code is included in second modulated control data from a second power receiver.
8. The power receiver of claim 1, wherein the power pick-up unit is further configured to retransmit the same modulated control data at a first random time interval that is different than a second random time interval associated with a transmission by a second power receiver of second modulated control data to the power transmitter.
9. The power receiver of claim 1, wherein:
the power pick-up unit is further configured to retransmit the same modulated control data at a first time interval,
the first time interval is based on an identification number assigned to the power receiver, and
the first time interval is different than a second time interval associated with a transmission by a second power receiver of second modulated control data to the power transmitter.
10. The power receiver of claim 1, wherein the modulated control data comprises one or more data packets, each of the one or more data packets including power adjustment information or information indicating the power status information.
11. The power receiver of claim 1, wherein:
the modulated control data comprises at least one data packet, and
the power pick-up unit is further configured to retransmit the same modulated control data if the at least one data packet includes information indicating the power status information.
12. The power receiver of claim 1, wherein:
the wireless coupling includes at least one of magnetic resonance, magnetic field induction, magnetic field radiation, electric field radiation, or electromagnetic field radiation, and
the power pick-up unit is further configured to retransmit the same modulated control data to the power transmitter via the wireless coupling a plurality of times.
13. The power receiver of claim 1, wherein the power transmitter comprises a pad-type wireless power transmitter or a pod-type wireless power transmitter.
14. The power receiver of claim 1, further comprising a load that is associated with charging a battery in a mobile device or with supplying power to the mobile device.
15. A power transmitter for supplying power to a power receiver, the power transmitter comprising:

a power conversion unit configured to transmit power to the power receiver via a wireless coupling with the power receiver; and a control unit configured to:
receive a first signal via the wireless coupling and determine if the first signal includes a transmission of control data, the control data determined and sent by the power receiver and configured to include power status information; and receive a second signal via the wireless coupling and determine if the second signal includes a retransmission of the same control data, the retransmission sent by the power receiver without the power receiver determining additional control data and regardless of whether the first signal is received by the power transmitter conditioned on the control data including the power status information.

16. The power transmitter of claim 15, wherein the control data is modulated with a spreading code that is shared by the power receiver and a second power receiver.

17. The power transmitter of claim 15, wherein the power conversion unit comprises a demodulator configured to detect modulation of the power.

18. The power transmitter of claim 17, wherein the control unit comprises a second demodulator configured to demodulate the control data with a shared spreading code.

19. The power transmitter of claim 15, wherein the control data comprises a data packet from the power receiver, the data packet including power adjusting information or information indicating the power status information.

20. The power transmitter of claim 15, wherein the control unit is further configured to receive two or more data packets partially overlapping in time from the power receiver and a second power receiver and to recover the two or more data packets by demodulating the two or more data packets with a shared spreading code.

21. The power transmitter of claim 15, wherein the power conversion unit is further configured to be wirelessly coupled to the power receiver and to a second power receiver via at least one of magnetic resonance, magnetic field induction, magnetic field radiation, electric field radiation, or electromagnetic field radiation.

22. The power transmitter of claim 15, further comprising a pad-type wireless power transmitter or a pod-type wireless power transmitter.

23. A system for controlling wireless power transfer, the system comprising:
a power receiver, wherein the power receiver is configured to:
receive power from a power transmitter via a wireless coupling;
determine and transmit modulated control data via the wireless coupling to the power transmitter;
retransmit the same modulated control data without determining additional control data and regardless of whether the modulated control data is received by the power transmitter conditioned on the modulated control data being determined by the power receiver to include power status information; and
receive adjusted power via the wireless coupling.

24. The system of claim 23, further comprising the power transmitter, wherein the power transmitter is further configured to:
receive the modulated control data via the wireless coupling;
adjust the power based on the modulated control data; and
transmit the adjusted power via the wireless coupling to the power receiver.

25. The system of claim 23, further comprising the power transmitter, wherein the power transmitter is configured to receive and recover portions of the modulated control data that are simultaneously transmitted from the power receiver and a second power receiver.

26. The system of claim 23, wherein the power receiver comprises:
a first modulator configured to modulate data with a spreading code to determine the modulated control data; and
a second modulator configured to modulate the power being received via the wireless coupling.

27. The system of claim 26, wherein the second modulator includes an impedance modulator configured to modulate an impedance of the power receiver based on the modulated control data.

28. The system of claim 23, wherein the power receiver is further configured to retransmit the same modulated control data a plurality of times.

29. The system of claim 23, wherein the modulated control data comprises at least one data packet, the at least one data packet including power adjusting information or information indicating the power status information.

30. The system of claim 29, wherein the power receiver is further configured to retransmit the same modulated control data a plurality of times if the at least one data packet includes information indicating the power status information.

31. The system of claim 23, further comprising the power transmitter, wherein the power transmitter comprises:
a first demodulator configured to detect a modulation of the power; and
a second demodulator configured to demodulate the modulated control data with a shared spreading code.

32. The system of claim 23, wherein the power receiver is further configured to be wirelessly coupled with the power transmitter via at least one of magnetic resonance, magnetic field induction, magnetic field radiation, electric field radiation, or electromagnetic field radiation.

33. The system of claim 23, further comprising the power transmitter, wherein the power transmitter comprises a pad-type wireless power transmitter or a pod-type wireless power transmitter.

34. A method for controlling power transmission to a mobile device, the method comprising:
receiving, by a power receiver in the mobile device, power from a power transmitter via a wireless coupling between the power transmitter and the power receiver;
determining and transmitting, by the power receiver, modulated control data via the wireless coupling to adjust the power; and
retransmitting the same modulated control data without determining additional control data and regardless of whether the modulated control data is received by the power transmitter if conditioned on the modulated control data is being determined by the power receiver to include power status information.

35. The method of claim 34, wherein determining the modulated control data comprises:
generating data to be transmitted to the power transmitter as the modulated control data; and
modulating the data with a shared spreading code.

36. The method of claim 34, wherein transmitting the modulated control data comprises modulating an impedance of the power receiver based on the modulated control data.

37. The method of claim 34, wherein the modulated control data is retransmitted a plurality of times.

38. The method of claim 34, wherein:
the modulated control data comprises at least one data packet including power adjusting information or information indicating the power status information of the power receiver,
the modulated control data is modulated with a shared spreading code, and
the shared spreading code is shared by a first modulator of the mobile device and a second modulator of a second mobile device.

39. The method of claim 38, wherein the modulated control data is retransmitted a plurality of times if the at least one data packet includes the information indicating the power status information.

40. An apparatus for controlling wireless power transfer, the apparatus comprising:
means for receiving power, from means for transmitting power, via a wireless coupling;
means for determining and transmitting modulated control data via the wireless coupling to the means for transmitting; and
means for retransmitting the same modulated control data without determining additional control data, and regardless of whether the modulated control data is received by the means for transmitting, conditioned on the modulated control data being determined to include power status information,
wherein the means for receiving is configured to receive adjusted power via the wireless coupling.

41. The apparatus of claim 40, wherein the means for receiving comprises:
first means for modulating configured to modulate data with a spreading code to determine the modulated control data; and
second means for modulating configured to modulate the power being received via the wireless coupling.

* * * * *